April 12, 1960 W. F. NEWBOLD ET AL 2,932,782
CONTROL APPARATUS FOR A GENERATOR
Filed April 2, 1958 3 Sheets-Sheet 1

FIG. 1

INVENTORS.
WILLIAM F. NEWBOLD
JOHN PARNELL
BY WILLIAM A. POWER

ATTORNEY.

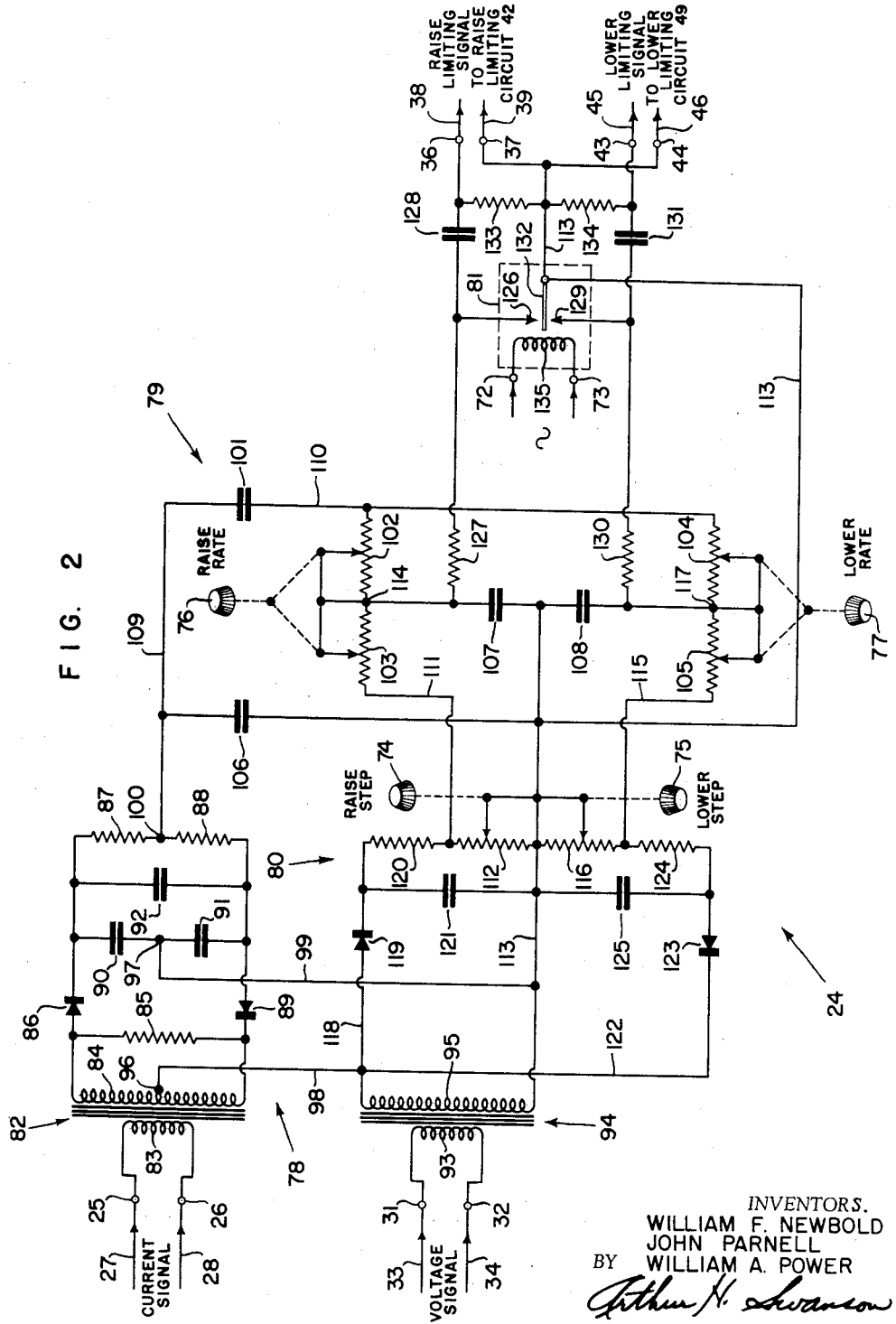

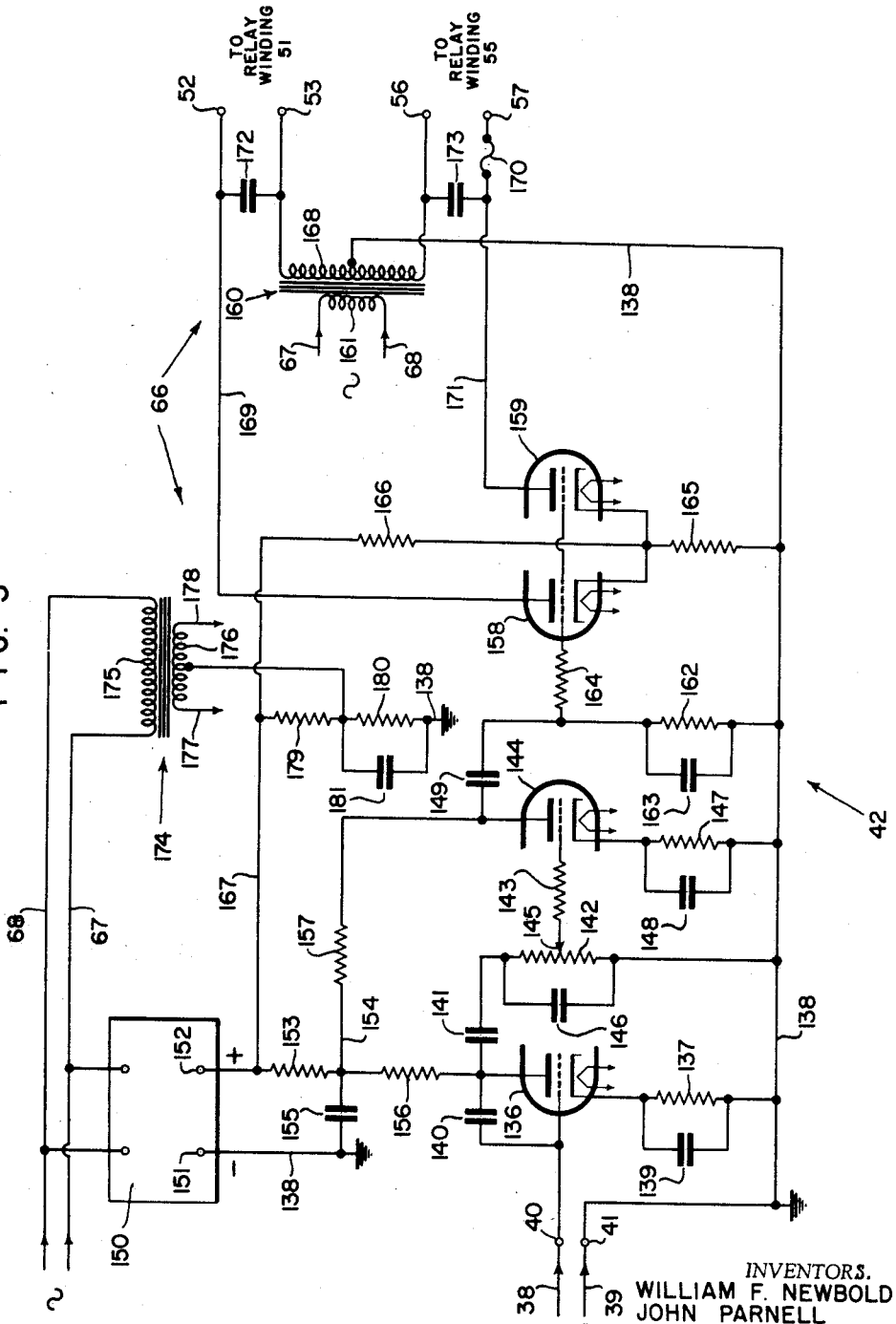

United States Patent Office 2,932,782
Patented Apr. 12, 1960

2,932,782
CONTROL APPARATUS FOR A GENERATOR

William F. Newbold, Philadelphia, William A. Power, Willow Grove, and John Parnell, Blue Bell, Pa., assignors to Minneapolis-Honeywell Regulator Company, Minneapolis, Minn., a corporation of Delaware Application April 2, 1958, Serial No. 725,884

16 Claims. (Cl. 322—19)

The present invention relates generally to apparatus for regulating or restricting the action of a controller on a controlled device. Specifically, the invention relates to such apparatus for limiting the control action which load and frequency control equipment applies to a steam operated prime mover driving an electrical generator in an electrical power generating plant, thereby to prevent such equipment from placing excessive demands on the steam equipment. More specifically, the invention relates to apparatus of this type which establishes a load regulation or maneuvering band within which the load and frequency controller can change the generator output without limitation as to rate, and outside of which the controller is prevented from changing the generator output at a rate greater than a predetermined rate.

A general object of the present invention is to provide improved apparatus for limiting or restricting the action or effect of a controller on a device which is normally under the influence of the controller. A specific object of the invention is to provide improved apparatus of this type for limiting the control effected by a load and frequency controller on a prime mover, such as a steam turbine, driving an electrical generator, thereby to limit the magnitude and rate of changes made to the generator output or load.

A more specific object of the invention is to provide improved rate limiting apparatus of the type just specified for establishing, in a novel manner and by solely electrical means, a load regulation or maneuvering band or range for the output of such a generator, within which range the associated load controller is permitted to change the generator output at any rate, and outside of which range the controller is permitted to change the generator output only at rates below a predetermined rate.

A still more specific object of the invention is to provide improved apparatus of the foregoing type which is operative to prevent the associated generator from both picking up and dropping load at greater than a predetermined rate except for load changes of magnitudes lying within said maneuvering band.

Another specific object of the inveniton is to provide improved apparatus as just described which temporarily prevents the associated load controller from adjusting the generator turbine governor further in the generation raise or lower direction whenever the controller attempts to step or rapidly swing the generator output above or below said maneuvering band, respectively, or when the controller attempts to respectively raise or lower the generator output outside of said band at a rate above a predetermined rate.

An even more specific object of the invention is to provide improved apparatus of the foregoing type which includes novel electrical circuitry for producing and regulating said maneuvering band and facilitating the desired setting and adjustment thereof, for facilitating the desired setting and adjustment of the maximum permissable rate of sustained generation change, and for automatically suspending the automatic control of the generator turbine governor by the load controller if the maneuvering band is exceeded for any step change in generation or if the predetermined maximum rate of sustained change of generation is exceeded.

Still another specific object of the present invention is to provide improved rate limiting apparatus as specified above which is constructed and arranged to be fail safe and hence to prevent the associated controller from changing the generator output in one or both directions upon the failure of some component or portion of the apparatus which prevents the latter from effecting its normal limiting operation in the corresponding direction or directions.

It is known that steam driven generating equipment, such as that employed in an electrical generating plant, for example, cannot be subjected to demand changes at rates in excess of predetermined rates without producing undesirable or even dangerous results. For example, if the output of a steam turbine driven generator is increased at such a rate as to cause the resulting rate of increase in steam demand to exceed a certain value, water will be likely to be carried over into the turbine, with disastrous results. Conversely, if the generator output is decreased at a sufficiently rapid rate to cause the resulting rate of drop in steam demand to exceed a certain value, the resulting excessive build-up of steam pressure is likely to result in the loss of fire in the boiler and/or the wasteful blowing of the boiler safety valves. Also, there is a limit to the rate at which the turbine itself can tolerate load changes. Therefore, there is a definite need in the power generation field for rate limiting apparatus which will be responsive to the rate of change of generator output or generation, and which will prevent automatic control means, such as a load and frequency controller, from changing this generation at a rate which is greater than that which the boiler and turbine can safely follow. In other words, limiting apparatus is needed which will interrupt or suspend for a suitable time period the generation-changing control action of automatic load and frequency control equipment whenever the rate of generation change becomes excessive, and which will thus prevent such automatic control equipment from placing excessive demands on the boiler-turbine combination.

For obvious practical reasons, however, the generating equipment in a plant must be capable of quickly assuming any value of load or generation within certain limits. Therefore, the required rate limiting apparatus must, in addition to providing the above rate limiting action, permit the generation to be changed rapidly or stepped to any desired value between said limits without limitation as to rate, and without suspending the automatic control of the turbine governor by the load controller. The range of generation between these limits is the aforementioned maneuvering band, which thus defines the range within which changes in generation can be effected safely at any rate.

Additionally, the required rate limiting apparatus must be fail safe: that is, it must not permit unsupervised, unrestricted loading or unloading of the generator by the automatic load and frequency control equipment to continue upon a failure within the limiting apparatus which prevents the latter from performing its normal limiting function. Such fail safe provisions desirably suspend the automatic control of the turbine governor only for operation in the load-changing direction corresponding to that over which the limiting apparatus has lost its supervisory control.

While there are prior rate limiting arrangements known in the art, all of such prior arrangements with which we are familiar are characterized by the inclusion of relatively complex mechanical and/or thermal configurations and other characteristics which prevent these arrangements from being fully satisfactory under those conditions wherein size, weight, cost, and freedom from complexity are important factors.

Accordingly, it is a prime object of the present invention to provide improved and novel rate limiting apparatus which fulfills the foregoing objects, which embodies and provides the several required operating features enumerated above, and which also is characterized by its relatively small size, lightness, and low cost, by the relative simplicity of its novel all-electric and electronic circuitry and actuation, and by its desirable and reliable performance with its fail safe aspects.

To the end of fulfilling the foregoing and other desirable objects and requirements, novel rate limiting apparatus embodying the present invention includes a novel electronic circuit which is supplied with signals representing the voltage and current of the generator output and which provides therefrom a D.C. signal of a magnitude which is proportion to the real power output or load of the generator. This signal is applied to an adjustable resistance-capacitance rate or differentiating network, the output of which is split and combined with adjustable bias signals to form generation raise and lower limiting signals. Each of these limiting signals, in turn, controls a pair of relays. As long as the generation or load is not being changed inappropriately in a given direction, the corresponding bias signal causes one of the corresponding pair of relays to be energized and the other to be deenergized, which is the so-called normal condition for the relays and permits load changes in the corresponding direction to be effected.

Upon the occurence of an excessive load change in a given direction, the corresponding bias signal is overcome by the rate network output, which causes a reversal of the energization of the corresponding relays. This in turn stops the associated turbine governor motor from changing the load further in this direction. This suspension of the governor motor operation is continued for a period which is sufficient to allow the steam equipment to catch up with the change in load demand.

The magnitude of the maximum rapid or step load change which the apparatus will tolerate without blocking the operation of the governor motor, and hence the width of the maneuvering band, are readily set by adjusting the values of the two bias signals. For any given values of these signals, the maximum rate of sustained load change which the apparatus will tolerate outside of the maneuvering band is readily set by adjusting the time constant of the rate network.

The novel circuits controlling the energization of the relays are so arranged that numerous component or circuit failures advantageously result in the deenergization of one or both of the normally energized relays, the energization of one or both of the normally deenergized relays, or a combination of such conditions, any one of which suspends the operation of the governor motor in one or both directions, depending upon the extent of loss of supervisory ability produced by the failure. Thus, there is provided the desirable safe failure action described hereinbefore.

A better understanding of the present invention may be had from the following detailed description when read in connection with the accompanying drawings, wherein:

Fig. 1 is a diagrammatic representation of rate limiting apparatus embodying the present invention and applied to a typical generating unit controlled by a typical load and frequency controller;

Fig. 2 is a schematic circuit diagram of the phase discriminator, rate, bias, and converter portions of the apparatus shown in block from in Fig. 1; and Fig. 3 is a schematic circuit diagram of one of the two identical limiting circuits shown in block form in Fig. 1.

The embodiment of the present invention chosen for illustration herein by way of example is shown in Fig. 1 as a rate limiting apparatus or a so-called rate limiter 1 for use with an electrical generator. For illustrative purposes, the rate limiter 1 is shown in Fig. 1 as being connected and arranged to supervise and to limit the controlling action of a typical automatic load and frequency controller 2 on a typical steam turbine generating unit 3. As noted hereinbefore, the purpose of such rate limiting apparatus is to prevent an automatic controller, such as the controller 2, from so changing the generator output as to place excessive demands on the steam equipment.

The generating unit 3 includes, in the usual manner, a generator 4 driven by a steam turbine 5. The operation of the latter is controlled by a conventional governor 6 which is responsive to the speed of the generator 4 and turbine 5 through a suitable linkage 7. The governor 6 regulates a valve 8 in the steam supply line 9 to the turbine 5, through a suitable linkage 10, in the usual manner necessary to raise the generator output when the governor set point is raised, and to lower this output when the governor set point is lowered.

Such set point adjustment is effected by the usual governor motor 11 having an armature 12 which adjusts the governor set point through a suitable linkage 13. The motor 11 also has set point and generation raise and lower windings 14 and 15, respectively. These are so arranged that, when the armature 12 is energized through the raise winding 14, the load or output or generation of the generator 4 is raised or increased. Similarly, when the armature 12 is energized through the lower winding 15, the generator output is lowered or decreased. All of this takes place, of course, only within the range of adjustment of the governor set point and the range of power output of the generator 4.

The raise and lower energizations of the governor motor 11 and the corresponding adjustments of the governor set point and generator output are normally made and controlled by the controller 2 in response to the character of an applied control signal. When this signal dictates that the generator output should be raised, the controller 2 moves a contact 16, through a suitable linkage 17, into engagement with a cooperating raise contact 18. This normally completes an energizing circuit for the raise winding 14 and armature 12 of the governor motor 11 through a raise conductor 19 and a common conductor 20 from a suitable motor energizing source, shown as a battery 21.

Similarly, when said control signal dictates that the output of the generator 4 should be lowered, the controller 2 moves the contact 16 into engagement with a cooperating lower contact 22. This normally completes an energizing circuit for the lower winding 15 and armature 12 of the governor motor 11 which includes a lower conductor 23 and the battery 21.

When the controller 2 is not called upon to make any change in the generator output, the contact 16 is maintained out of engagement with both of the contacts 18 and 22. This leaves the motor 11 and the governor set point stationary, and the generator output constant.

The foregoing operation of the controller 2 in controlling the operation of the governor motor 11 is referred to as the normal operation of the described arrangement to show that this is the operation which takes place when the limiter 1 is not intervening to prevent the controller 2 from changing the output of the generator 4. As is apparent from the description of such limiting apparatus as set forth hereinbefore, however, the limiter 1 effects its stated protective function by interrupting and suspending the operation of the governor motor 11 whenever the controller 2 attempts to change the generator output in an excessive manner. To this end, the governor motor raise and lower conductors 19 and 23 have therein a plurality of limiter relay contacts, to be described hereinafter. It is sufficient to note at this point that, upon the controller 2 calling for an excessive generation change in a given direction, the limiter 1 opens appropriate ones of these contacts as necessary to hold the motor 11 inoperative in the appropriate direction for a sufficient time to allow the steam equipment to catch up with the generation change. This prevents the generation from being changed inappropriately by the controller 2, and thus protects the steam equipment as noted above.

The rate limiter 1

The rate limiter 1 according to the present invention includes a section 24 consisting of phase discriminator, rate, bias, and converter portions, all of which will be described in detail hereinafter in connection with their detailed showing in Fig. 2. For the present, it is sufficient to note that the several portions within the section 24 cooperate to provide raise and lower limiting signals which change appropriately when the output of the generator 4 is changed in an inappropriate manner. To this end, the section 24 is supplied with two signals which are employed to obtain a measure of the real power portion of the generator output. One of these signals is a current signal which, as shown in Fig. 1, is supplied to input terminals 25 and 26 of the section 24 by respective conductors 27 and 28 from the secondary winding 29 of a current transformer which is responsive to the current in one of the output conductors 30 of the generator 4. This current signal is thus representative of the current component of the generator output.

The second of the above two signals is a voltage signal which is supplied to input terminals 31 and 32 of the section 24 from the secondary winding of a potential transformer 35 which is responsive to the voltage between two of the generator output conductors 30. This voltage signal is thus representative of the voltage component of the generator output.

The aforementioned raise limiting signal is produced between output terminals 36 and 37 of the section 24, and is applied by respective conductors 38 and 39 to input terminals 40 and 41 of a raise limiting circuit 42. Similarly, the aforementioned lower limiting signal is produced between output terminals 43 and 44 of the section 24, and is applied by respective conductors 45 and 46 to input terminals 47 and 48 of a lower limiting circuit 49. In response to the corresponding one of these limiting signals, each of these limiting circuits 42 and 49 controls the operation of the ones of the aforementioned relay contacts which are included in the corresponding one of the governor motor energizing conductors 19 and 23, as will now be explained.

The raise limiting circuit 42 controls the energization of two raise limiting relays, one of which has a pair of contacts 50 which are included in series in the raise conductor 19. This relay also has an operating winding or coil 51 which is connected between and controlled from the output terminals 52 and 53 of the circuit 42. The contacts 50 are closed whenever the winding 51 is not operatively energized, and are open when this winding is energized.

The other of the raise limiting relays controlled by the circuit 42 has a pair of contacts 54 which are included in series with the contacts 50 in the raise conductor 19. This relay also has an operating winding or coil 55 which is connected between and controlled from output terminals 56 and 57 of the circuit 42. The contacts 54 are closed whenever the winding 55 is operatively energized, and are open when this winding is deenergized.

As long as the output of the generator 4 is not increasing inappropriately, the raise limiting signal applied by the section 24 to the circuit 42 causes the relay winding 51 to be deenergized and the relay winding 55 to be energized. Therefore, the contacts 50 and 54 are maintained closed for this normal condition, and the governor motor raise conductor 19 and raise circuit are not interrupted, as is desired. Because of this energization pattern for the raise limiting relays for this normal condition, the relay having the winding 51 is conveniently referred to as a normally deenergized raise limiting relay, while the relay having the winding 55 is referred to as a normally energized raise limiting relay.

Upon the detection by the section 24 of an inappropriate increase in generator output, such as too large a step change or too rapid a change outside of the aforementioned maneuvering band, the raise limiting signal is changed by the portion 24 to cause the circuit 42 to energize the normally deenergized relay winding 51 and to deenergize the normally energized relay winding 55. This reversal in the energization pattern for the raise limiting relays results in the opening of the contacts 50 and 54, and the interruption of the raise conductor 19 and the raise circuit for the motor 11. Accordingly, the latter is temporarily blocked from further increasing the generator output, as is desired.

As will become apparent from the detailed descriptions of the circuitry of the limiter 1 to be presented hereinafter in connection with the detailed showings of Figs. 2 and 3, most circuit or component failures in the apparatus which would prevent the foregoing protective or raise limiting action from being effected are arranged to cause the winding 51 to be energized and/or the winding 55 to be deenergized. Any such failure is seen to be a safe failure, since it results in the opening of the contacts 50 and/or 54, and hence in the interruption of the raise conductor 19 and the necessary suspension of the operation of the governor motor 11 in the raise direction.

The lower limiting circuit 49 is identical to the raise limiting circuit 42, and controls the energization of two lower limiting relays, one of whch has a pair of contacts 58 which are included in series in the lower conductor 23. This relay also has an operating winding or coil 59 which is connected between and controlled from output terminals 60 and 61 of the circuit 49. The contacts 58 are closed whenever the winding 59 is not operatively energized, and are open when this winding is energized.

The other of the lower limiting relays controlled by the circuit 49 has a pair of contacts 62 which are included in series with the contacts 58 in the lower conductor 23. This relay also has an operating winding or coil 63 which is connected between and controlled from output terminals 64 and 65 of the circuit 49. The contacts 62 are closed whenever the winding 63 is operatively energized, and are open when this winding is deenergized.

As long as the output of the generator 4 is not decreasing inappropriately, the lower limiting signal applied by the section 24 to the circuit 49 causes the relay winding 59 to be deenergized and the relay winding 63 to be energized. Therefore, the contacts 58 and 62 are maintained closed for this normal condition, and the governor motor lower conductor 23 and lower circuit are not interrupted, as is desired. As for the raise limiting relays, the relay having the winding 59 is a normally deenergized relay, while the relay having the winding 63 is a normally energized relay.

Upon the detection by the section 24 of the inappropriate decrease in generator output, such as too large a step change or too rapid a change outside of the maneuvering band, the lower limiting signal is changed by the portion 24 to cause the circuit 49 to energize the normally deenergized relay winding 59 and to deenergize the normally energized relay winding 63. This reversal in the energization pattern for the lower limiting relays results in the opening of the contacts 58 and 62, and the interruption of the lower conductor 23 and the lower circuit for the motor 11. Accordingly, the latter is temporarily blocked from further decreasing the generator output, as is desired.

As for the raise limiting portion of the apparatus previously described herein, most circuit or component failures which would prevent the foregoing lower limiting supervisory action from being effected are arranged to cause the winding 59 to be energized and/or the winding 63 to be deenergized. Such failures are therefore safe failures, since they result in the opening of the contacts 58 and/or 62, and hence in the interruption of the lower conductor 23 and the necessary suspension of the operation of the governor motor 11 in the lower direction.

The limiter 1 of Fig. 1 also includes a power supply portion 66 which is shown as being energized by alternating current supply conductors 67 and 68, and as supplying the necessary energization to the circuits 42 and 49 over the respective connections 69 and 70. The section 24 is also supplied with alternating energizing current by the supply conductors 67 and 68 through a suitable step-down transformer 71 and terminals 72 and 73. This energization of the section 24 provides for the operation of the converter portion thereof as will become apparent from the detailed description of the Fig. 2 circuit to follow below.

In order to permit the adjustment of the width of the maneuvering band established by the limiter 1, and to permit the adjustment of the maximum rate of change of generation which the limiter will tolerate in either direction outside of the maneuvering band without suspending the operation of the governor motor 11, the section 24 is provided with the manually adjustable controls 74 through 77. The manner in which these controls adjust components in the section 24 to provide the adjustment of the noted quantities or characteristics will be explained in detail in connection with the circuit of Fig. 2.

Summarizing the foregoing description of the rate limiter 1 of Fig. 1, it is noted that this apparatus is supplied by conductors 27, 28, 33, and 34 with generator output current and voltage signals which enable the section 24 to produce a measure of the power being produced by the generator 4. The section 24 utilizes this measure of the generator output to produce raise and lower limiting signals in respective raise and lower limiting channels. These channels include respective raise and lower limiting circuits 42 and 49, and each channel terminates in a pair of relays connected to the output of the corresponding limiting circuit and energized therefrom in response to the corresponding limiting signal.

The contacts of each pair of relays are connected in series in the corresponding one of the raise and lower governor motor energizing conductors 19 and 23. One of the relays in each pair or channel is arranged to be energized, and the other is arranged to be deenergized, as long as the generator output is not changing inappropriately in the direction corresponding to that channel as determined by the settings of the controls 74 through 77. Under this condition, the relay contacts for that channel are held closed by the corresponding limiting signal, and the governor motor 11 is permitted to follow the dictates of the controller 2 for changing the generation in the corresponding direction.

If the section 24 detects that, with respect to the settings of the controls 74 through 77, the generator output is increasing too rapidly outside of the maneuvering band established by the section 24, or is being stepped rapidly out of this band, the raise limiting signal is changed so as to cause the circuit 42 to reverse the energization of the raise limiting relay windings 51 and 55. This results in the opening of the relay contacts 50 and 54 and the temporary blocking of the motor 11 in the generation-increasing direction. This same operation for blocking the motor 11 in the generation-decreasing direction is produced by the section 24 and the lower channel when the section 24 detects that the generation is changing inappropriately in the downward direction.

It is apparent from the foregoing that the raise channel supervises and limits the change of generator loading in the upward direction, and that the lower channel supervises and limits the change of generator loading in the downward direction. Thus, the limiter 1 prevents the generator 4 from picking up or dropping load at too fast a rate, and hence enables the steam equipment to keep up with the generator loading.

In addition to the foregoing, any component or circuit failure which causes one or more of the relay contacts 50, 54, 58, and 62 to open blocks the motor 11 from changing the generator output in the corresponding direction or directions. Such failures are thus safe failures, since the motor 11 is prevented from changing the generation in a direction over which the limiter 1 is no longer able to exercise its rate limiting operation.

The circuits of Fig. 2

As previously noted, the section 24 of the rate limiter 1 includes phase discriminator, rate, bias, and converter portions of the apparatus. Circuits for these portions according to the present invention are shown in detail in Fig. 2, wherein it is shown that the section 24 includes a phase discriminator circuit 78, a resistance-capacitance rate or differentiating circuit or network 79 having adjustable time constants, an adjustable raise and lower bias producing circuit 80, a synchronous converter or chopper 81, and circuit connections interconnecting these circuits or portions.

The phase discriminator 78

The purpose of the phase discriminator 78 is to provide the apparatus with a measure of the real power output of the generator 4 so as to enable the apparatus to detect when this output is changing inappropriately with respect to the desired step and rate values for which the apparatus has been adjusted. To this end, the discriminator 78 is arranged to produce a D.C. output signal of a magnitude which is proportional to the real power output of the generator 4. The manner in which the discriminator 78 is constructed and arranged to produce such a signal will now be described.

The discriminator 78 includes a current transformer 82 having a primary winding 83 and a center-tapped secondary winding 84. The primary winding 83 is connected between the aforementioned terminals 25 and 26, and thus is supplied with the generator output current signal supplied by the conductors 27 and 28. A loading resistor 85 is connected across the secondary winding 84 to cause the latter to produce across this resistor a voltage which is proportional to the current in the primary winding 83.

The voltage developed across the resistor 85 is applied to the rest of the discriminator circuit in the following manner. The connected upper end terminals of the winding 84 and resistor 85 are connected to the connected lower end terminals of this winding and resistor by a series circuit which can be traced from said upper terminals through a diode rectifier 86, in the forward direction, a resistor 87, a resistor 88, and a diode rectifier 89, in the forward direction, back to said connected lower end terminals. Condensers 90 and 91 are connected in series across the series-connected resistors 87 and 88, as is a single condenser 92.

The switching or phasing voltage for the discriminator is derived from the generator output voltage signal supplied to the terminals 31 and 32 by the conductors 33 and 34. To this end, the primary winding 93 of a potential transformer 94 is connected between the terminals 31 and 32, and the secondary winding 95 of this transformer is connected between the center tap 96 of the current transformer secondary winding 84 and the junction point 97 between the condensers 90 and 91. Specifically, a conductor 98 connects the upper end terminal of the winding 95 to the center tap 96, while a conductor 99 connects the lower end terminal of the winding 95 to the junction 97. As a result, the switching voltage provided by the winding 95 is applied between the center tap 96 and the junction 97 of the discriminator circuit 78.

The D.C. discriminator output signal is produced between the junction 97 and the junction 100 between the series-connected resistors 87 and 88. By virtue of the foregoing connections, and by suitably relating the relative magnitudes of the voltages of the applied current signal and voltage signal, the magnitude of this D.C. output signal is caused to be proportional to the in-phase current of the generator output. Since the voltage of the generator output is substantially constant, this D.C. discriminator output signal between the junctions 97 and 100 can be and is considered, for the purposes of the present invention, to have a magnitude which is proportional to that of the real power output of the generator 4, as is desired.

The accuracy with which the magnitude of the discriminator output voltage represents a quantity which is proportional to the value of the real power output of the generator 4 depends upon the relative values of the voltages of the current signal and voltage signal applied to the section 24, as mentioned above. If the voltage of this current signal applied between the terminals 25 and 26 is maintained equal to or less than one-third of the voltage of this voltage signal applied between the terminals 31 and 32, the magnitude of the discriminator output voltage will be proportional to the value of the real power output of the generator within approximately one percent. While such accuracy is entirely satisfactory for the purposes of the present invention, it can be increased by increasing the voltage of the voltage signal relative to the voltage of the current signal.

The rate circuit 79

The purpose of the rate circuit or network 79 is to differentiate the voltage proportional to generator output produced by the discriminator 78 so as to produce raise and lower rate signals which are employed in detecting whether the generator output is changing at a permissible rate or at an inappropriate rate in either direction. Thus, the circuit 79 includes a rate condenser 101, adjustable raise rate resistors 102 and 103, adjustable lower rate resistors 104 and 105, and filter or stray reducing condensers 106, 107, and 108.

The rate network 79 is actually a split circuit consisting of two R-C rate circuits or portions, one of which is a raise circuit and includes the condenser 101 and the resistors 102 and 103, and is the beginning of the aforementioned raise limiting channel. This circuit differentiates the output voltage of the discriminator 78 to produce a raise rate signal. The other of these portions is a lower R-C circuit and includes the condenser 101 and the resistors 104 and 105, and is the beginning of the aforementioned lower limiting channel. This circuit differentiates the discriminator output voltage to produce a lower rate signal.

Stating the foregoing in a different manner, the discriminator output or power voltage is applied to the rate network 79, wherein it is differentiated to form a split rate output, one part of which is a raise rate signal produced by the raise R-C circuit including the condenser 101 and the resistors 102 and 103. The other part of said split output is a lower rate signal produced by the lower R-C circuit including the condenser 101 and the resistors 104 and 105.

Specifically, the discriminator output voltage, appearing between the junctions 97 and 100, is applied to the raise R-C circuit, which can be traced from the junction 100 through a conductor 109, the condenser 101, a conductor 110, the resistors 102 and 103, a conductor 111, an adjustable bias signal introducing resistor 112 of the bias portion 80, a conductor 113, and the conductor 99 back to the junction 97. As a result, a D.C. raise rate signal is effectively developed in the raise output of the network 79, between the conductor 113 and the junction 114 between the resistors 102 and 103.

The magnitude of this raise rate signal for any given adjustment of the resistors 102 and 103 is a function of the rate of change of the discriminator output voltage for a sustained change in this voltage, and is a function of the amplitude of a step change in this output voltage. Therefore, for any given adjustment of the resistors 102 and 103, the magnitude of the D.C. raise rate signal is a function of the rate of a sustained change in the generator output, and is a function of the amplitude of a step change in this output.

The adjusted values of the resistors 102 and 103 determine the time constant for the raise R-C circuit for any given value for the condenser 101, since the value of the bias resistor 112 can be made to be small compared to the values of the resistors 102 and 103. The values of the resistors 102 and 103 are conveniently jointly set at means of the raise rate control or knob 76, which simultaneously adjusts a contact along each of these resistors, these contacts being connected together to the connected ends of the resistors 102 and 103 at the junction 114. As was mentioned previously herein, and as will be readily apparent from the present and forthcoming description, the adjustment of the time constant of the raise R-C circuit by the adjustment of the knob 76 and the resistors 102 and 103 sets or determines the maximum rate of sustained generator load increase outside of the maneuvering band which the apparatus will tolerate, without blocking the operation of the governor motor 11 in the generation increasing direction, for any adjusted value of the raise bias signal produced by the circuit 80, to be described hereinafter.

The lower R-C portion of the rate network 79 is also supplied with, and differentiates, the discriminator output voltage produced between the junctions 97 and 100 of the circuit 78. This lower R-C circuit and its input connections can be traced from the junction 100 through the conductor 109, the condenser 101, the conductor 110, the resistors 104 and 105, a conductor 115, an adjustable bias signal introducing resistor 116 of the bias portion 80, and the conductors 113 and 99 back to the junction 97. As a result, a D.C. lower rate signal is effectively developed in the lower output of the network 79, between the common conductor 113 and the junction 117 between the resistors 104 and 105.

The magnitude of this lower rate signal for any given adjustment of the resistors 104 and 105 is a function of the rate of change of the discriminator output voltage, and hence of the generator output, for a sustained change in the latter. Also, this lower rate signal magnitude is a function of the amplitude of a step change in the discriminator output voltage and generator output.

The adjusted values of the resistors 104 and 105 determine the time constant for the lower R-C circuit for any given value of the condenser 101, since the value of the bias resistor 116 can be made to be small compared to the values of the resistors 104 and 105. The values of the resistors 104 and 105 are conveniently jointly set by means of the lower rate control or knob 77, which simultaneously adjusts a contact along each of these resistors, these contacts being connected together to the connected ends of the resistors 104 and 105 at the junction 117. As was mentioned previously herein, and as will be readily apparent from the present and forthcoming description, the adjustment of the time constant of the lower R-C circuit by the adjustment of the knob 77 and the resistors 104 and 105 sets or determines the maximum rate of sustained generator load decrease outside of the maneuvering band which the apparatus will tolerate, without blocking the operation of the governor motor 11 in the generation decreasing direction, for any adjusted value of the lower bias signal produced by the circuit 80, about to be described.

Completing the description of the rate network 79, it is noted that the condenser 106 is connected between the conductors 109 and 113, while the condensers 107 and 108 are respectively connected between the junctions 114 and 117 and the common conductor 113. As noted previously herein, these condensers provide desirable filtering or stray reducing actions.

It is seen from the foregoing that, for a given change in the generator output, the rate network 79 develops two D.C. rate signals. These signals increase, as a function of this change as explained above, in the same direction with the same polarity, as determined by the direction of the generation change. Further, these signals have relative magnitudes determined by the time constant settings of the respective resistors 102—103 and 104—105. For an increase in generation, the two rate signals increase in what will be referred to herein as the negative direction, while for a generation decrease these two signals increase in the positive direction.

However, these rate signals, by themselves, do not actually appear in the output of the rate network 79, but are combined in this network with the respective raise and lower bias signals, produced across the respective resistors 112 and 116 by the circuit 80, to form the aforementioned raise and lower limiting signals. It is these signals which actually appear between the respective junctions 114 and 117 and the common conductor 113 in the output of the rate network 79.

*The bias circuit 80*

The purpose of the circuit 80 is to produce the adjustable raise and lower D.C. bias signals whose adjusted values determine or set the width of the maneuvering band established and controlled by the section 24. These bias signals are derived from the transformer 94 and, as noted above, are produced across the respective adjustable resistors 112 and 116 for introduction into the rate network and for combination with the respective rate signals produced therein. To this end, the raise bias resistor 112 is connected across the secondary winding 95 of the transformer 94 in a circuit which can be traced from the upper end terminal of the winding 95 through a conductor 118, a diode rectifier 119, in the forward direction, a resistor 120, the resistor 112, and the common conductor 113 back to the lower end terminal of the winding 95. A filter condenser 121 is connected across the resistors 120 and 112. As a result, the adjustable raise bias signal produced across the resistor 112 in series with the raise rate signal in the raise R-C circuit is a so-called positive bias signal. The polarity of this bias signal is such that this signal is opposed by the negative raise rate signal which occurs for generation increases, and is aided by the positive raise rate signal which occurs for generation decreases. Therefore, the raise limiting signal appearing between the junction 114 and the conductor 113, which is the resultant of the raise rate and bias signals, is a so-called positive signal which is decreased and made less positive by generation increases, and which is increased and made more positive by generation decreases.

As will be explained below, the circuit 42 is arranged to energize the two raise relays in the normal manner, to leave the governor motor 11 free to increase the generation, as long as the raise limiting signal is kept sufficiently positive: that is, as long as the positive raise bias signal is not overcome by the negative raise rate signal which is produced by generation increases. Such an increase which causes the negative raise rate signal to overcome the positive raise bias signal to make the raise limiting signal sufficiently less positive causes the circuit 42 to reverse the energization of the raise relays and to block the governor motor in the raise direction. Generation decreases have no effect on the raise relays, however, since the resulting positive raise rate signal only adds to the positive raise bias signal to make the already positive raise limiting signal even more positive.

Similarly, the lower bias resistor 116 is connected to the secondary winding 95 in a circuit which can be traced from the upper end terminal of this winding through a conductor 122, a diode rectifier 123, in the reverse direction, a resistor 124, the resistor 116, and the conductor 113 back to the lower end terminal of the winding 95. A filter condenser 125 is connected across the resistors 124 and 116. As a result, the adjustable lower bias signal produced across the resistor 116 in series with the lower rate signal in the lower R-C circuit is opposite in polarity to the raise bias signal, and hence is a so-called negative bias signal. The polarity of the lower bias signal is thus such that this signal is aided by the negative lower rate signal which occurs for generation increases, and is opposed by the positive lower rate signal, which occurs for generation decreases. Therefore, the lower limiting signal appearing between the junction 117 and the conductor 113, which is the resultant of the lower rate and bias signals, is a so-called negative signal which is increased and made more negative by generation increases, and which is decreased and made less negative by generation decreases.

As will be explained below, the circuit 49 is arranged to energize the two lower relays in the normal manner to leave the governor motor 11 free to decrease the generation, as long as the lower limiting signal is kept sufficiently negative: that is, as long as the negative lower bias signal is not overcome by the positive lower rate signal which is produced by generation decreases. Such a decrease which causes the positive lower rate signal to overcome the negative lower bias signal to make the lower limiting signal sufficiently less negative causes the circuit 49 to reverse the energization of the lower relays and to block the governor motor in the lower direction. Generation increases have no effect on the lower relays, however, since the resulting negative lower rate signal only adds to the negative lower bias signal to make the already negative lower limiting signal even more negative.

The value of the resistor 112, and hence the magnitude of the raise bias signal, is conveniently set by means of the raise step control or knob 74 which adjusts a contact along the resistor 112 connected to the lower end of the latter. Similarly, the value of the resistor 116, and hence the magnitude of the lower bias signal, is conveniently set by means of the lower step control or knob 75 which adjusts a contact along the resistor 116 connected to the upper end of the latter. The reason that these settings and bias signal values determine the respective upper and lower limits, and hence the width, of the maneuvering band is that it is the magnitude of each bias signal which determines the maximum value of the corresponding rate signal, and hence the size of the maximum step change in generation in the corresponding direction, which can be tolerated without causing the bias signal to be overcome to reverse the energization of the corresponding two relays and to suspend the operation of the governor motor for generation changes in the corresponding direction. Thus, the magnitude of the maximum rapid or step load change which the apparatus will tolerate without blocking the operation of the governor motor, and hence the width of the maneuvering band, are readily set by adjusting the controls 74 and 75 and hence the values of the respective raise and lower bias signals.

It should be readily apparent from the foregoing that, for any given adjusted values of the raise and lower bias signals by the respective step controls 74 and 75, the values of the time constants of the raise and lower R-C circuits which are set by the adjustments of the respective rate controls 76 and 77 determine the maximum rate of sustained load change outside of the established maneuvering band which the apparatus will tolerate without reversing the energization of the relays and blocking the governor motor 11. That this is so is clearly seen from the fact that these time constants affect the values of the rate signals for given rates of generation change, and hence determine which rates will cause the values of the rate signals to be such as to overcome the corresponding bias signals and reverse the energization of the corresponding relays.

*The converter 81*

The purpose of the converter 81 is to convert the D.C. raise and lower limiting signals into corresponding A.C. signals so that the circuits 42 and 49 can employ A.C. amplifiers and phase sensitive circuits for these signals. Accordingly, a first stationary contact 126 of the converter 81 is connected through an isolating resistor 127 to the raise limiting signal junction 114, and is connected through a coupling condenser 128 to the output terminal 36. Further, a second stationary converter contact 129 is connected through an isolating resistor 130 to the lower limiting signal junction 117, and is connected through a coupling condenser 131 to the output terminal 43. The movable contact 132 of the converter is connected to the common conductor 113, which is also connected to the output terminals 37 and 44. Input resistors 133 and 134 for the respective circuits 42 and 49 are connected between the output terminals 36—37 and 43—44, respectively.

The converter 81 also has an operating winding 135 which is connected between and supplied with alternating energizing voltage from the terminals 72 and 73. Accordingly, the converter 81 is operative, in the usual manner, to cause the contact 132 to engage the contacts 126 and 129 alternately at the frequency of, and in synchronism with, the alternating energizing voltage. As a result, A.C. versions of the raise and lower limiting signals are produced between the respective output terminals 36—37 and 43—44.

It is apparent from the foregoing that the two A.C. limiting signals, produced between the output terminals 36—37 and 43—44 will normally have the same phase. That is, these two signals will be in phase as long as the bias signals are predominating and are not fully overcome by the opposing rate signals. This is true, notwithstanding the fact that the two bias signals are of opposite polarity as explained above.

Thus, when there is no raise rate signal opposing the positive raise bias signal, the resulting A.C. raise limiting signal has a given phase and amplitude. The subsequent appearance of an increasing negative raise rate signal causes the amplitude of the raise limiting signal to decrease. At the point where the negative raise rate signal fully overcomes and then exceeds the positive raise bias signal, the raise limiting signal passes through zero amplitude and then increases with a phase opposite to that which it previously had. Thus, the A.C. raise limiting signal is caused to reverse in phase as the negative raise rate signal fully overcomes the positive raise bias signal, as occurs upon an inappropriate generation increase.

What has just been said applies as well to the A.C. lower limiting signal, except in this case it is an inappropriate generation decrease which reduces the amplitude and then reverses the phase of this signal. In either case, a change in generation in the direction opposite to that which decreases and reverses the phase of the corresponding limiting signal merely increases the amplitude of that signal.

*The circuit of Fig. 3*

The circuit shown in Fig. 3 is that of a suitable form which both of the identical limiting circuits 42 and 49 of Fig. 1 may take according to the present invention. For descriptive purposes, the Fig. 3 circuit has been shown as being the circuit for the raise limiting circuit 42. However, the circuit for the lower limiting circuit 49 may be, and will be assumed to be, identical to that shown in Fig. 3, except that the lower limiting circuit 49 would have input terminals 47 and 48 and output terminals 60, 61, 64, and 65, and would control the energization of relay windings 59 and 63, all as shown in Fig. 1.

The circuit 42 includes a two-stage resistance coupled amplifier which amplifies the A.C. raise limiting signal and applies it to a phase sensitive output circuit which controls the energization of the raise relay windings 51 and 55. To this end, the control grid of a first stage amplifier triode electron tube 136 is connected to the input terminal 40. The cathode of the triode 136 is connected through a cathode bias resistor 137 to a circuit ground conductor 138 which is connected to the other input terminal 41. A cathode bypass condenser 139 is connected in parallel with the resistor 137. A stabilizing condenser 140 is connected between the control grid and the plate of the triode 136.

The plate of the triode 136 is connected through a coupling condenser 141, an adjustable portion of a grid resistor 142, and a series grid resistor 143 to the control grid of a second stage amplifier triode 144. The resistor 142 is actually connected between the coupling condenser 141 and the conductor 138, and has an adjustable slider contact 145 which is connected through the resistor 143 to the control grid of the triode 144. A phasing condenser 146 is connected in parallel with the resistor 142. The contact 145 permits the gain of the amplifier to be adjusted in the usual manner.

The cathode of the triode 144 is connected to the conductor 138 through a cathode bias resistor 147, across which is connected a cathode bypass condenser 148. The plate of the triode 144 is coupled to the phase sensitive portion of the circuit by a coupling condenser 149.

The triodes 136 and 144 receive D.C. plate circuit energizing voltage from a D.C. power supply 150. The supply 150 may be considered to be part of the power supply 66 shown in Fig. 1, and is energized from the A.C. supply conductors 67 and 68. The supply 150 may supply similar D.C. energizing voltage to the circuit 49, as shown in Fig. 1. The negative output terminal 151 of the supply 150 is connected to the conductor 138, and thence to the cathodes of the triodes 136 and 144.

The positive terminal 152 of the plate supply 150 is connected through a filter resistor 153 to a conductor 154 which in turn is connected through a filter condenser 155 to the conductor 138. A plate load resistor 156 for the triode 136 is connected from the plate of the latter to the conductor 154. Likewise, a plate load resistor 157 for the triode 144 is connected from the plate of the latter to the conductor 154. This completes the circuit of the two-stage amplifier.

The phase sensitive portion of the circuit 42 includes triode electron tubes 158 and 159, an A.C. plate supply transformer 160, and other components to be described. The transformer 160 may form another part of the aforementioned power supply 66, and may also supply A.C. plate voltage to the phase sensitive portion of the circuit 49, if desired. The transformer 160 has a primary winding 161 which is connected to and energized from the A.C. supply conductors 67 and 68. In order for the phase sensitive circuit to respond properly to the amplified A.C. raise limiting input signal, the converter 81 of Fig. 2 and the transformer 160 must be energized from the same A.C. source, as shown, or at least from sources which are in phase with each other.

The coupling condenser 149 connects the plate of the triode 144 through a grid resistor 162 to the conductor 138. A phasing condenser 163 is connected in parallel with the resistor 162. The junction between the condenser 149 and the resistor 162 is connected through a series grid resistor 164 to the connected control grids of the triodes 158 and 159. The series grid resistors 143 and 164 serve to prevent overloading of the associated circuits.

The cathodes of the triodes 158 and 159 are connected together and through a cathode bias resistor 165 to the conductor 138. These triodes are also supplied with a fixed, positive, D.C. cathode bias by connection from the cathodes of the triodes 158 and 159 to the positive power supply terminal 152. This connection includes a resistor 166 and a conductor 167.

The A.C. plate supply transformer 160 has a center-tapped secondary winding 168, the upper end terminal of which is connected to the output terminal 53 and thence through the relay winding 51 to the output terminal 52. The latter is connected to the plate of the triode 158 by a conductor 169. Similarly, the lower end terminal of the winding 168 is connected to the output terminal 56, through the relay winding 55 to the output terminal 57, and through a fuse 170 and a conductor 171 to the plate of the triode 159. The plate circuits of the triodes 158 and 159 are completed by a connection between the center tap of the winding 168 and the conductor 138, which is connected to the cathodes of the triodes 158 and 159 as noted above. A condenser 172 is connected across the relay winding 51 between the terminals 52 and 53, while a condenser 173 is connected across the series combination of the relay winding 55 and the fuse 170, between the terminal 56 and the conductor 171.

By virtue of the foregoing connections, the triodes 158 and 159 are alternately supplied with plate voltage in the conductive direction, this application alternating in synchronism with the A.C. supply voltage and the raise limiting signal. In the absence of any raise limiting signal applied to the input terminals 40 and 41, the bias on the triodes 158 and 159 is such as to keep them cut off and nonconductive, and hence to prevent them from energizing either of the relay windings 51 and 55.

The phasing of the A.C. plate supply voltage for the triodes 158 and 159 relative to that of the normal raise limiting signal is such that the plate of the triode 159 is made positive during the alternate half cycles of the supply voltage in which the normal raise limiting signal swings the control grid of the triode 159 in the positive direction. As explained above, such a normal raise limiting signal is produced as long as the positive raise bias signal predominates and causes the raise limiting signal to have its normal phase. Thus, the normal predominance of the raise bias signal, when no inappropriate generation increase is occuring, causes the resulting raise limiting signal to maintain the triode 159 alternately conductive and the relay winding 55 energized. The condenser 172 maintains the energization of the winding 55 over the non-conductive half cycles of the triodes 159.

In view of the foregoing, the relay having the winding 55 is the normally energized raise limiting relay as explained hereinbefore in connection with Fig. 1. This so-called normal condition prevails only so long as the generation is not being inappropriately increased so as to cause the resulting negative raise rate signal to overcome the positive raise bias signal and thus reduce the amplitude and reverse the phase of the raise limiting signal. When this occurs, the raise limiting signal no longer causes the triode 159 to be conductive, whereby the latter is then cut off, and the relay winding 55 becomes deenergized.

The same normal raise limiting signal which normally maintains the triode 159 alternately conductive and the relay winding 55 normally energized also maintains the triode 158 normally non-conductive and the relay winding 51 normally deenergized. This takes place because the normal raise limiting signal merely swings the control grid of the triode 158 further in the cut-off direction during the alternate supply voltage half cycles in which the plate of this triode is made positive, and thus swings this controls grid in the positive direction only during the half cycles in which the associated plate is made negative. Therefore, the relay having the winding 51 is the normally deenergized raise limiting relay as explained hereinbefore.

The decrease in amplitude and reversal in phase of the raise limiting signal, produced by an inappropriate generation increase, which causes the relay winding 55 to become deenergized also causes the relay winding 51 to become energized, since the control grid of the triode 158 is now swung in the positive direction during the half cycles in which the associated plate is made positive. Therefore, an inappropriate generation increase, with its resulting decrease in amplitude and reversal in phase of the raise limiting signal, causes the reversal of the conductivity pattern for the triodes 158 and 159, the reversal of the energization pattern for the relay windings 51 and 55, the opening of the relay contacts 50 and 54, and the blocking of the governor motor 11 in the generation increasing direction. As noted previously, a generation decrease does not affect the raise relays or the triodes 158 and 159, since such a decrease merely increases the amplitude of the raise limiting signal with the same, normal phase.

In practice, the relay winding 51 does not become energized at exactly the same instant that the winding 55 becomes deenergized, since the raise limiting signal must actually decrease, slightly, to zero and then increase slightly with the opposite phase between the deenergization of the winding 55 and the energization of the winding 51. For purposes of description, and for all practical purposes, however, it can be assumed that these two events take place at the same time. The actual limiting action occurs, of course, at the instant that the winding 55 is deenergized, and the additional energization of the winding 51 serves a safe failure purpose, as will be seen from the following description.

By virtue of the inclusion of the dual relays and other circuit features as noted herein, the apparatus provides safe failure operation for practically all of the power, component, and circuit failures which might occur and otherwise leave the operation of the governor motor 11 unsupervised or unlimited. For example, and with specific references to the raise channel of the apparatus as described in detail above, any power, electron tube, or relay failure results in the opening of one or both of the sets of raise relay contacts 50 and 54, and hence is a safe failure. Further, the loss of the raise bias or limiting signals opens the contacts 54, since the relay winding 55 is energized as a result of the raise bias signal. Likewise, any gain or power failure in the amplifier prevents the winding 55 from being energized and hence is a safe failure. Such failures include reduction of cathode emission, grid-plate short circuits, and grid-cathode short circuits for the first two amplifier stages.

Additionally, grid-cathode short circuits of the triodes 158 and 159 are safe failures, since they result in the energization of both of the relay windings 51 and 55. Likewise, a grid-plate short circuit in the triode 158 energizes the winding 51 and hence is a safe failure. A grid-plate short circuit in the triode 159 is made to be a safe failure by the inclusion of the fuse 170, since such a short circuit increases the plate current of the triode 159, blows the fuse 170, and thus causes the winding 55 to be deenergized.

In order to make the apparatus fail safe for heater-cathode short circuits in any of the electron tubes, the heaters of the latter are maintained highly positive with respect to the cathodes. To accomplish this, the heater energizing source, shown in Fig. 3 as a transformer 174 forming a part of the power supply 66, is connected to the positive terminal 152 of the D.C. source 150. Specifically, the primary winding 175 of the transformer 174 is connected to and energized from the A.C. supply conductors 67 and 68, while the center-tapped secondary winding 176 of this transformer energizes the heaters of the triodes 136, 144, 158, and 159 through partially-shown conductors 177 and 178 in the usual manner. However, the tap on the winding 176 is connected through a resistor 179 to the conductor 167 and thence to the positive supply terminal 152. This tap is also connected to the ground conductor 138 through a resistor 180 across which is connected a condenser 181.

As noted hereinbefore, the construction of the lower limiting circuit 49 is identical to that of the circuit 42 as described in detail above. Likewise, the operation of the circuit 49 is identical in all respects to that of the circuit 42, except that the circuit 49 responds only to generation decreases. This selective identity of operation for the circuits 42 and 49 is made possible by the above-noted fact that both of the raise and lower limiting signals normally have the same phase, and that each of these signals decreases and reverses in phase only upon an inappropriate generation change in the corresponding direction. Thus, an inappropriate generation increase which decreases and reverses the phase of the raise limiting signal, and hence causes a reversal in the energization of the raise relay windings 51 and 55, only increases the value of the lower limiting signal, and hence does not affect the lower relays. Conversely, an inappropriate generation decrease decreases and reverses the phase of the lower limiting signal, and hence causes a reversal in the energization of the lower relay windings 59 and 63, but merely increases the value of the raise limiting signal, and hence does not affect the raise relays.

Because of the identity between the construction of the raise limiting circuit 42 and that of the lower limiting circuit 49, the latter, and the entire lower channel, provide the same safe failure operation as outlined above for the raise channel.

It is noted that the actual magnitude of a step generation change or rate of a sustained generation change which will cause the apparatus to provide its limiting action for a given setting of the controls 74 through 77 may be less than the maximum for which these controls are adjusted, if such change occurs sufficiently soon after another change in the same direction. This is due to the memory aspects of the operation of the rate network, which are due to the charge-storing action of the rate condenser 101. For example, if an initial step increase in generation takes place which is just short of the maximum permissible value as set by the control 74, the raise limiting relay contacts will not be opened. However, these contacts will be opened if the generation attempts to make a similar, otherwise permissible, step increase shortly after the initial increase and before the charge on the condenser 101 from the first increase has had time to be dissipated sufficiently. Such operation is seen to provide a further protection for the steam equipment, since it prevents undesirable overloads or underloads which would otherwise occur if two or more otherwise permissible step and/or rate changes in the same direction took place too closely together in time. The extent of this memory is a function of the time constant of the corresponding R-C circuit, and thus, at a time corresponding to one time constant following an event, the memory has lost approximately 63% of its effectiveness.

In practice, it is usually desirable to provide a rate limiter, such as the limiter 1, for each generating unit in a plant. In this way, each limiter can be desirably adjusted in accordance with the characteristics and peculiarities of the corresponding unit. It is also usually desirable in practice to arrange the limiting apparatus, as is done in the Fig. 1 arrangement, so that manual control of the loading of the generator is not affected by the presence of the limiter. In this way, the generation can be changed at will under emergency conditions.

It should be readily apparent from the foregoing that there has been provided novel and highly desirable rate limiting apparatus which prevents automatic control equipment from changing the output of a generating device at inappropriate rates, thereby to prevent the control equipment from placing excessive demands on the equipment which drives the generating device.

What is claimed is:

1. Rate limiting apparatus, comprising a first electrical circuit adapted to be supplied with electrical signals representative of the current and voltage of the electrical output of a generating device, said circuit producing an output voltage representative of the real power output of said device, a resistance-capacitance differentiating circuit connected ot said first circuit and operative to differentiate said output voltage to produce a rate signal, and means responsive to the magnitude of said rate signal and adapted to restrict the changing of the output of said device when said magnitude exceeds a predetermined value therefor.

2. Rate limiting apparatus, comprising an electrical circuit adapted to be supplied with electrical signals representative of the current and voltage of the electrical output of a generating device, said circuit producing an output voltage representative of the real power output of said device, differentiating means connected to said circuit and operative to differentiate said output voltage to produce a rate signal, means for producing a bias signal and for combining the latter in opposition to said rate signal to produce a resultant signal, said rate signal predominating over said bias signal when the output of said device changes at an excessive rate greater than a predetermined rate, and means responsive to the magnitude of said resultant signal and adapted to restrict the changing of the output of said device when said rate signal predominates over said bias signal.

3. Rate limiting apparatus, comprising first means for producing a bias signal of adjustable value, second means for producing a rate signal of a value dependent upon the rate of change of a variable, third means interconnecting said first and second means and opposing said bias and rate signals to produce a resultant limiting signal, fourth means adapted to restrict the changing of said variable when said fourth means is deenergized, and fifth means connected to said fourth means and responsive to said limiting signal to energize said fourth means when said bias signal predominates over said rate signal, and to deenergize said fourth means upon the effective disappearance of said bias signal.

4. Rate limiting apparatus, comprising first means for producing a bias signal of adjustable value, second means for producing a rate signal of a value dependent upon the rate of change of a variable, third means interconnecting said first and second means and opposing said bias and rate signals to produce a resultant limiting signal, a first relay adapted to restrict the changing of said variable in one direction when energized, a second relay adapted to restrict the changing of said variable in said one direction when deenergized, fourth means connected to said relays and responsive to said limiting signal to energize said second relay but not said first relay when said bias signal predominates over said rate signal, and to energize said first relay but not said second relay when the effect of said bias signal is absent from said fourth means.

5. Apparatus as specified in claim 4, wherein the failure of said bias signal to reach said fourth means in the absence of said rate signal causes neither of said relays to be energized.

6. Rate limiting apparatus, comprising a first circuit responsive to the output of a device for producing a first signal of a value dependent upon the magnitude of said output, a second, all-electrical circuit for establishing an adjustable maneuvering band for the magnitude of said output and including first means for producing adjustable raise and lower bias signals of opposite polarity, the values of which determine the width of said band, second means connected to said first circuit for differentiating said first signal to produce a rate signal, and third means for combining said rate and bias signals and for producing therefrom resultant limiting signals which change in a predetermined manner when said output is stepped out of said band or changes at greater than a predetermined rate outside of said band, and means responsive to said limiting signals to restrict the changing of the magnitude of said output upon the production of said predetermined change in said limiting signals, whereby said output is permitted to change at any rate within said band, but is restricted from changing outside of said band at rates above said predetermined rate.

7. Apparatus as specified in claim 6, wherein said second circuit includes a split resistance-capacitance network, wherein said rate signal has raise and lower signal portions, each of which is produced by a corresponding part of said split network, wherein said third means combines said raise rate and bias signals to form a raise limiting signal, and combines said lower rate and bias signals to form a lower limiting signal, and wherein said predetermined change, for a change in said output in a given direction, is a decrease in one of said limiting signals and a corresponding increase in the other of said limiting signals.

8. Apparatus for lmiting the extent of step changes and the rate of sustained changes in the output of an electrical generator, the output of which is normally under the control of a controller, comprising means adapted to supply to a first circuit first signals representative of the values of components of the output of a generator, said first circuit producing a second signal representative of the real power portion of the generator output, a second circuit connected to said first circuit and operative to differentiate said second signal to produce raise and lower rate signals in respective raise and lower channels, a third circuit arranged to produce raise and lower bias signals of opposite polarity, means for combining said raise rate and bias signals in said raise channel to produce therein a resultant raise limiting signal, means for combining said lower rate and bias signals in said lower channel to produce therein a resultant lower limiting signal, whereby an increase in the generator output decreases said raise limiting signal and increases said lower limiting signal, while a decrease in the generator output decreases said lower limiting signal and increases said raise limiting signal, a fourth circuit included in said raise channel and responsive to siad raise limiting signal to interrupt the action of the controller in the generator output increasing direction when the raise limiting signal decreases below a predetermined value, and a fifth circuit included in said lower channel and responsive to said lower limiting signal to interrupt the action of the controller in the generator output decreasing direction when the lower limiting signal decreases below a predetermined value.

9. Apparatus as specified in claim 8, wherein the output of the generator is an A.C. output, wherein said first signals comprise a current signal of a value representative of a current component of the generator output, and a voltage signal of a value representative of the voltage of the generator output, each of said current and voltage signals being an A.C. signal, wherein said first circuit is a phase discriminator circuit, wherein said current signal is applied as the input signal to said discriminator circuit, wherein said voltage signal is applied as the reference signal for said discriminator circuit, and wherein the value of said voltage signal is made sufficiently larger at all times than the corresponding value of said current signal to make the value of said second signal representative of the real power portion of the generator output when the voltage of the generator output is substantially constant.

10. Apparatus as specified in claim 8, wherein one of said first signals is a voltage signal of a value representative of the voltage of the generator output, and wherein said voltage signal energizes said third circuit for the production of said raise and lower bias signals, whereby the disappearance of said voltage signal results in the disappearance of said raise and lower bias signals.

11. Apparatus as specified in claim 8, wherein the value of each of said raise and lower bias signals is individually adjustable so as to permit the setting of a maneuvering band for the output of the generator.

12. Apparatus as specified in claim 11, wherein said second circuit is a split resistance-capacitance rate circuit having a raise portion terminating in a first output in said raise channel and having a lower portion terminating in a second output in said lower channel, said raise rate signal being produced in said first output, and said lower rate signal being produced in said second output, and wherein each of said raise and lower portions of said rate circuit includes adjustable means to permit the individual adjustment of the time constant of that portion, whereby a given change in the generator output causes said raise and lower rate signals to have relative values dependent upon the relative adjustments of said adjustable means.

13. Apparatus as specified in claim 8, wherein said fourth circuit includes electronic amplifying means and relay means, said relay means having contact means arranged to interrupt the action of the controller in the generator output increasing direction when said relay means is deenergized, said amplifying means controlling the energization of said relay means in response to said raise limiting signal to cause said relay means to be deenergized when said raise limiting signal decreases below said predetermined value therefor, and wherein said fifth circuit includes electronic amplifying means and relay means, the last mentioned relay means having contact means arranged to interrupt the action of the controller in the generator output decreasing direction when said last mentioned relay means is deenergized, the last mentioned amplifying means controlling the energization of said last mentioned relay means in response to said lower limiting signal to cause said last mentioned relay means to be deenergized when said lower limiting signal decreases below said predetermined value therefor.

14. Apparatus as specified in claim 13, wherein each of said fourth and fifth circuits includes an additional relay means energized by the corresponding one of said amplifying means and having contact means arranged to interrupt the action of the controller in the corresponding generator output changing direction when this additional relay means is energized, wherein each of said raise and lower limiting signals is an A.C. signal which reverses in phase upon an inappropriate change in the generator output in the corresponding direction, and wherein each of said amplifying means includes phase sensitive means for deenergizing the corresponding one of the first mentioned relay means and energizing the corresponding one of said additional relay means when the corresponding one of said limiting signals reverses in phase.

15. Apparatus as specified in claim 14, wherein each of said amplifying means includes safe failure provisions for deenergizing the corresponding one of the first mentioned relay means upon the failure of that amplifying means to amplify the corresponding one of said limiting signals.

16. Apparatus as specified in claim 15, wherein each of said amplifying means includes electron tubes having cathodes and cathode heaters, and wherein said safe failure provisions include means for maintaining each of said heaters at a relatively high positive D.C. potential with respect to the associated cathode, whereby a cathode to heater short circuit in any of the electron tubes of a given one of said amplifying means causes the corresponding one of the first mentioned relay means to be deenergized.

References Cited in the file of this patent

UNITED STATES PATENTS 2,221,579    Gulliksen    Nov. 12, 1940
2,300,515    Ludwig    Nov. 3, 1942